(No Model.) 2 Sheets—Sheet 2.
W. J. M. DOBSON.
APPARATUS FOR TRANSMITTING MOTION.
No. 431,039. Patented July 1, 1890.
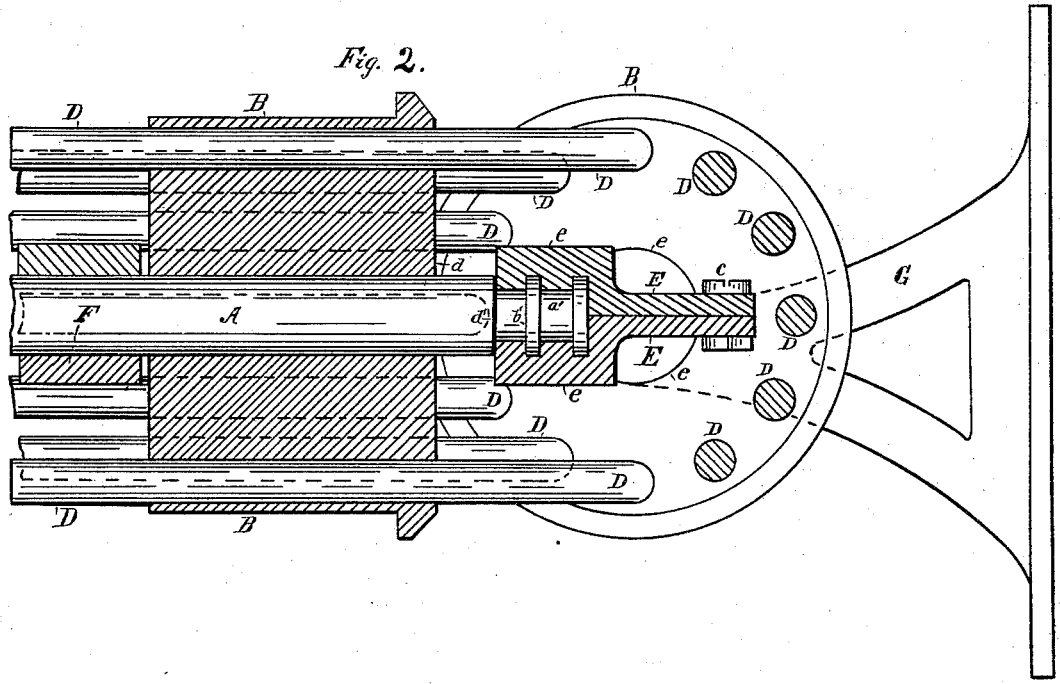
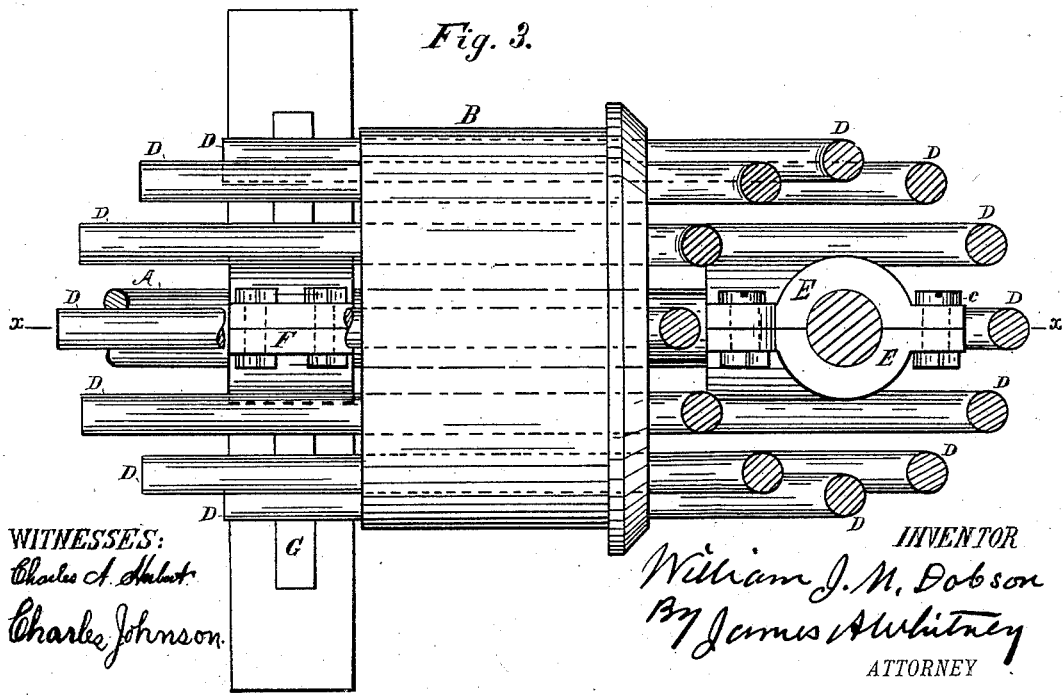
WITNESSES:
Charles A. Halut
Charles Johnson
INVENTOR
William J. M. Dobson
By James A. Whitney
ATTORNEY

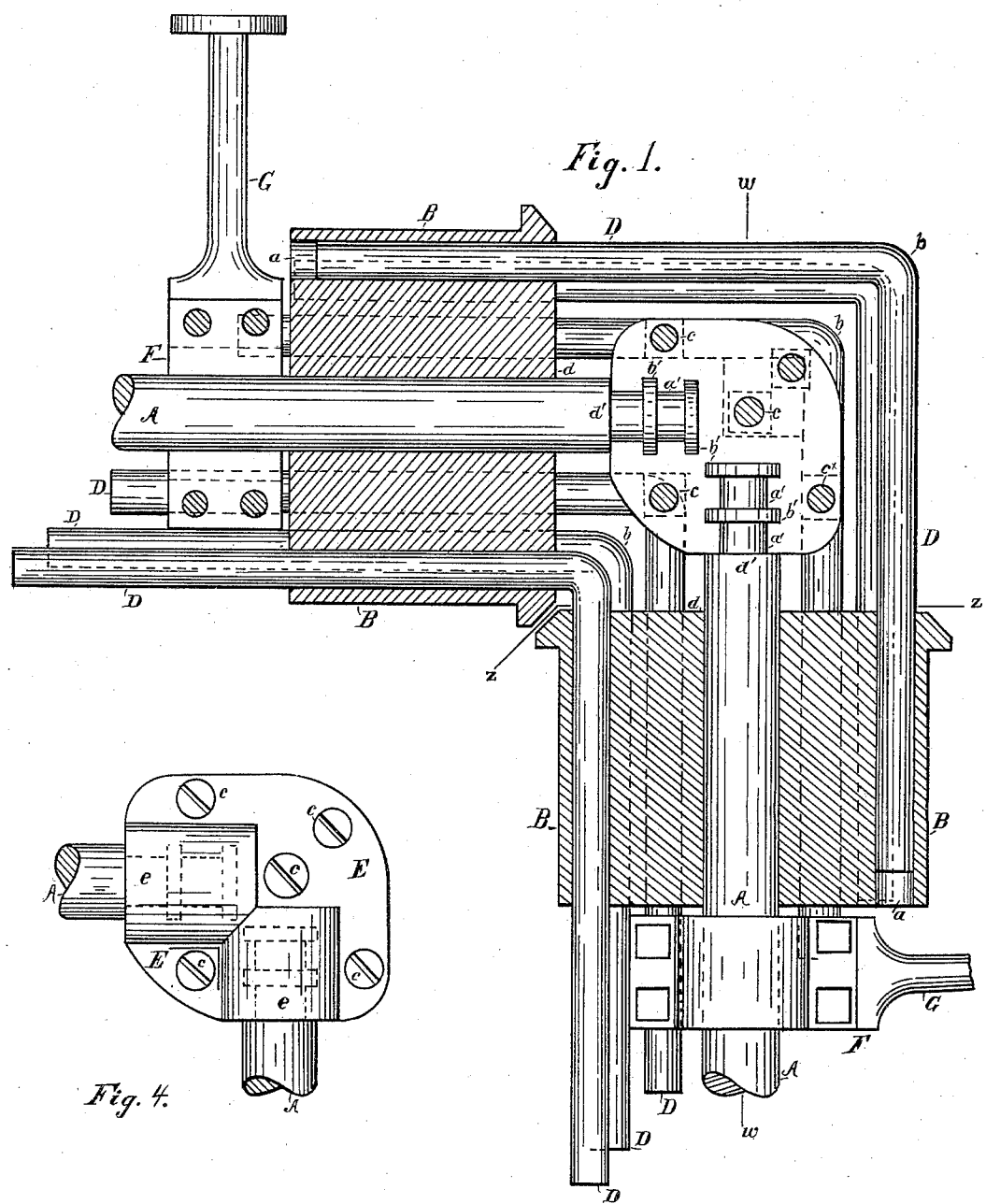

UNITED STATES PATENT OFFICE.

WILLIAM J. M. DOBSON, OF BROOKLYN, NEW YORK, ASSIGNOR TO WILLIAM C. BOONE, OF SAME PLACE.

APPARATUS FOR TRANSMITTING MOTION.

SPECIFICATION forming part of Letters Patent No. 431,039, dated July 1, 1890.

Application filed February 12, 1890. Serial No. 340,209. (No model.)

*To all whom it may concern:*

Be it known that I, WILLIAM J. M. DOBSON, of Brooklyn, in the county of Kings and State of New York, have invented certain new and useful Improvements in Apparatus for Transmitting Motion; and I do hereby declare that the following is a full, clear, and exact description of the invention, which will enable others skilled in the art to which it appertains to make and use the same.

This invention relates to that class of mechanism by which motion is transmitted from one to the other of two shafts placed at an angle to each other by means of angular bars or rods, the arms of which slide in slots or bores provided in the bosses or blocks attached to said shafts.

The object of my invention is to secure greater permanence and steadiness in the motion and operation of such apparatus, and less unequal wear upon the journals and journal-boxes of the shafts than has been feasible with this class of mechanism as constructed previous to my said invention. Hitherto the bosses, which are frequently of considerable weight, have been placed upon the unsupported ends of the shafts and at a distance from the shaft-bearings. This has been done in deference to certain mechanical difficulties which, by my said invention, are overcome, thereby securing the advantages hereinbefore indicated.

Figure 1 is a horizontal sectional view taken in the line $x\,x$ of Fig. 3, representing an apparatus constructed according to my said invention. Fig. 2 is a vertical sectional view taken in the line $w\,w$ of Fig. 1. Fig. 3 is a like view taken in the line $z\,z$ of Fig. 1, and Fig. 4 is a detail view of certain parts.

A A are the shafts, from the one to the other of which motion is to be transmitted. These shafts are provided each with a boss B, in which, parallel with the shaft, are any desired number of slots or bores $a$. These shafts are placed substantially at a right angle to each other.

In the slots or bores $a$ of the two bosses B are placed the opposite arms of elbow bars or rods D, as more clearly represented in Fig. 1. The opposing arms of the elbow-rods D are arranged to longitudinally slide readily in their respective slots. When one of the shafts is rotated by any suitable power applied thereto, the elbow-rods play in and out from the slots in the bosses. When the elbow-rods in the revolution of the bosses approach the outside angle of the adjacent bosses, they draw out to the requisite degree from the bores or slots and move inward as they recede from the outer angle. When desired, the elbow-rods D may each be made in two sections, connecting at the head or angle $b$ by a universal joint of any suitable kind, as in the invention of William C. Boone, (shown in his application filed January 17, 1890, Serial No. 337,162,) for an improvement in apparatus for transmitting motion.

In my invention the inner ends of the shafts A A are combined with devices which, in their one function, prevent the material displacement of the shafts with reference to each other, and in another function prevent the inward longitudinal movement of said shafts. In order to restrain the said shafts and the bosses carried thereby from moving too far inward, and also securing the further result of effectually steadying the said shafts during their rotation, the inner ends $d'$ of the shaft are made to project beyond the inner ends $d$ of their respective bosses and bear against fixed thrust-resisting bearings $e$. These end bearings $d'$ may be made with circumferential grooves and ridges $a'$ and $b'$, which fit into correspondingly-shaped thrust-bearings, and in this case not only prevent the inward thrust of the shafts, but in a measure prevent the outward thrust also. These thrust-bearings are provided upon a block or hanging bracket E, or other suitable device, which, by attachment to the ends of the shafts, is suspended therefrom, the two ends of the shafts being thus caused to mutually support each other.

Behind each of the bosses B is a fixed bearing F. These bearings F are provided upon brackets G, or other suitable supports placed in due and fixed position and secured in place by any suitable means. Each bearing is so shaped as not to interfere with the adjacent shaft—as, for example, by a suitable opening in the bearing for the shaft to pass through—and should not be long enough to interfere with the rearward projection of the arms of the elbow-rods as they are brought to the inner angle of the two bosses. The parts should, further, be so proportioned that the arms of said elbow-rods when at the outer angle of the bosses will not extend back far enough to come in contact with the supports G of the adjacent fixed bearing F. By this means the bearings are enabled to be brought close to the bosses, and thereby much more effectually support their weight and diminish jar.

The block or hanging bracket E should be made in two pieces or sections suitably recessed internally to receive the inner ends of the shafts and to provide the end or thrust bearings hereinbefore particularized, the two sections being held together by suitable bolts or rivets c, as indicated in the drawings. It will be observed that the block or hanging bracket E also serves the purpose of preventing any longitudinal thrust of the shafts and of keeping said shafts in due relation with each other—in other words, prevents lateral displacement of the shafts with reference to each other—and this effect may be obtained apart from the advantage of resisting longitudinal thrust of the shafts by making the bearings in the block or hanging bracket of simple cylindrical form and devoid of a bearing against the ends of the shafts.

What I claim as my invention is—

1. The combination, with the bosses B, the elbow-rods D, and the shafts A, having their inner ends projecting beyond the inner ends of their respective bosses, of a suspended thrust-bearing arranged to receive said inwardly-projecting ends of the shafts to connect and insure the mutual co-operation of the said shafts, substantially as and for the purpose herein set forth.

2. The combination, with the shafts A, their bosses B, and elbow-rods D, of a suspended thrust-bearing interposed between the shafts at their inner ends, and fixed bearings arranged to act upon the outer ends of the bosses of said shafts, substantially as and for the purpose herein set forth.

3. The combination, with the bosses B, the elbow-rods D, and the shafts A, having their inner ends projecting beyond the inner ends of their respective bosses, of a suspended thrust-bearing interposed between the shafts at their inner ends, and fixed bearings arranged to act upon the outer ends of the bosses of said shafts, substantially as and for the purpose herein set forth.

4. The combination, with the shafts A, their bosses B, and elbow-rods D, of a bearing arranged in proximity to the outer ends of the said bosses in such relation with the elbow-rods that the latter at the inner part of the angle formed by the bosses may thrust outward past and external to the said bearings and parallel with the shafts, while those at the outer angle do not reach thereto, substantially as and for the purpose herein set forth.

WILLIAM J. M. DOBSON.

Witnesses:
CHARLES A. HERBERT,
ALBERT C. AUBERY.